United States Patent Office 3,116,213
Patented Dec. 31, 1963

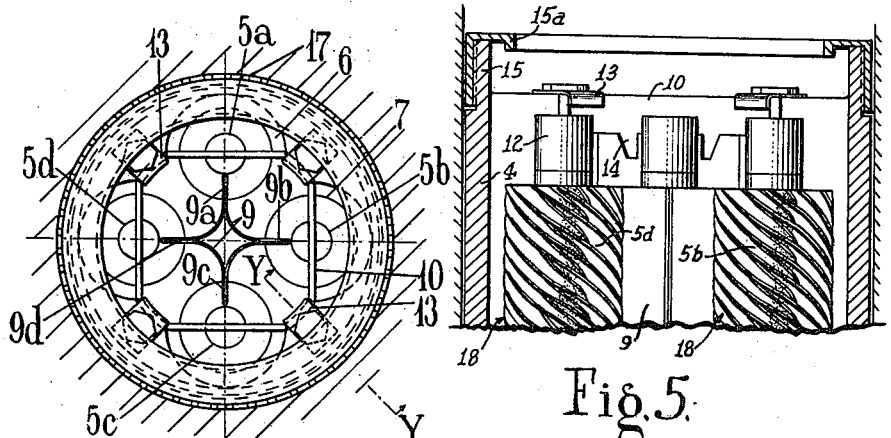
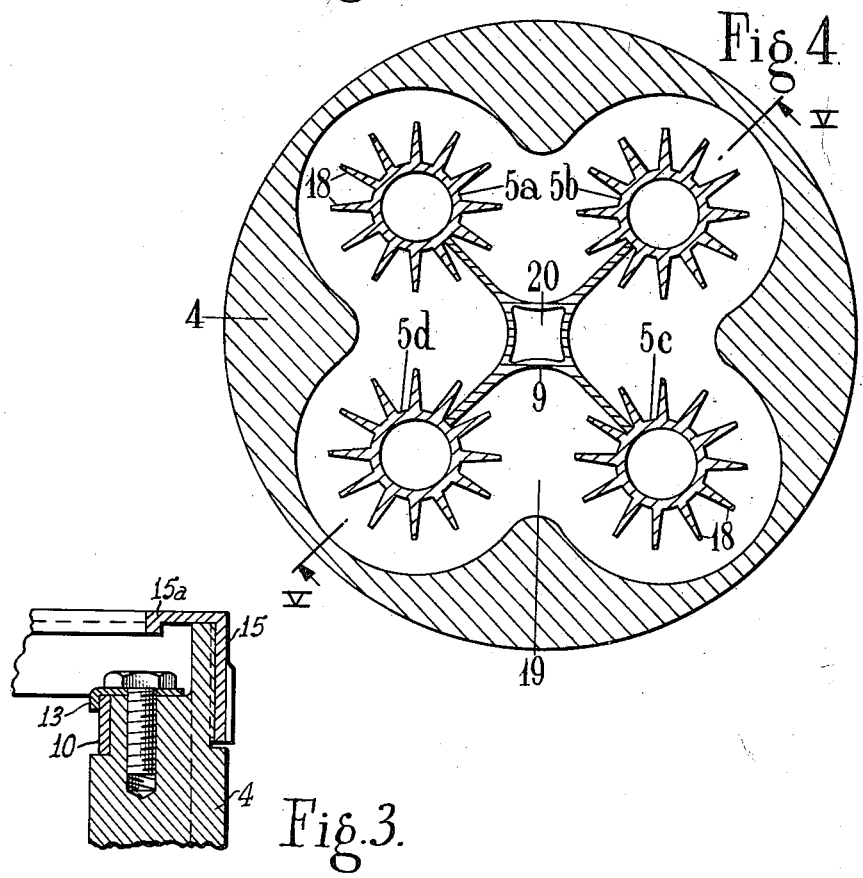

3,116,213
HEAT EXCHANGE ELEMENTS SUITABLE FOR USE AS FUEL ELEMENTS FOR NUCLEAR REACTORS
Heinrich Hugo Ludolf Ritz, Newcastle-upon-Tyne, England, assignor to C. A. Parsons & Company Limited, Newcastle-upon-Tyne, England
Filed May 20, 1958, Ser. No. 736,561
Claims priority, application Great Britain May 21, 1957
4 Claims. (Cl. 176—78)

This invention relates to heat exchange elements and is concerned mainly but not exclusively with fuel elements for nuclear reactors.

The invention is primarily concerned with the provision of a fuel element for a nuclear reactor, but may be used in conventional heat exchange processes.

In gas cooled graphite moderated reactors it is common practice to house nuclear fuel in a series of containers located in channels formed in the graphite moderator. Cooling gas is caused to circulate through the channels over the surfaces of the fuel containers to remove heat developed in the nuclear fuel during operation of the reactor.

In order to increase heat transfer from the fuel containers it is also common practice to add fins to the surface of the containers to increase the heat transfer surface.

The heat transfer can also be improved by inducing certain flow patterns for the cooling gas and by making the cross section of the nuclear fuel, which in general has a low conductivity, a minimum.

The main object of the present invention is to provide an improved heat exchange element which incorporates the above-mentioned features and which is suitable for use as a fuel element in a nuclear reactor.

In co-pending application Number 635,628 we describe a fuel element for a nuclear reactor in which the fuel container was housed in but spaced from a graphite container, the graphite container being located in a channel in the reactor moderator and spaced therefrom to permit a cooling gas to flow between the container and the moderator.

A second object of the present invention is to employ an arrangement of tubular elements according to the preceding paragraph, or to embody therein matters according to the aforesaid co-pending patent application.

Referring to the diagrammatic drawings accompanying the specification:

FIGURE 2 is a sectional plan view on line XX of FIGURE 1 looking in the direction of the arrows;

FIGURE 3 is a sectional view on line YY of FIGURE 2 looking in the direction of the arrows and shows an enlarged view of a clamping arrangement;

FIGURE 4 is a section on line OO of FIGURE 1 looking in the direction of the arrows;

FIGURE 5 is a section on line V—V of FIGURE 4 as to the casing and showing two opposite fuel elements and the central support structure in elevation.

Figure 1:
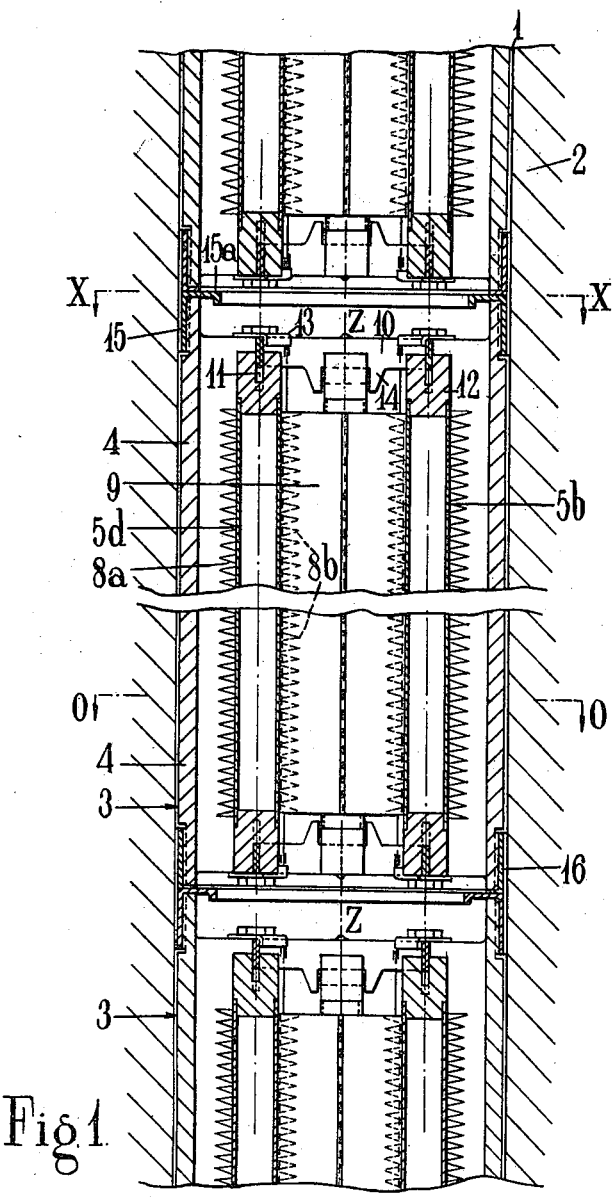
FIGURE 1 shows a section through a channel formed in neutron moderating material in a nuclear reactor, the section showing a fuel element and sections through parts of adjacent fuel elements in the channel.

In carrying the invention into effect in the form illustrated by way of example and referring first to FIGURES 1 and 2, a channel 1 in neutron moderating material 2, of a nuclear reactor houses a plurality of fuel elements 3 stacked one on top of the other.

Each fuel element 3 comprises a graphite container 4 and four fuel containers 5a, b, c, and d (see FIGURE 2) arranged side by side in the graphite container 4 with their axes parallel and symmetrically disposed about a common axis ZZ.

The graphite container has an internal profile of clover leaf form forming four circular recesses 6 in which the fuel containers are located.

The fuel containers have helical fins on their surfaces but for the sake of simplicity these are not shown in detail. The radial extent of the fin in each case is indicated by a circle 7 in FIGURE 2 and by full and dotted lines 8a, 8b respectively in FIGURE 1.

Dividing the space between the containers is a support member 9 coaxial with the common axis ZZ, the member 9 having radially extending members 9a, b, c and d, the purpose of which will be explained below. The members 9a, b, c and d enter slots cut in the helical fins and extend radially close to the wall of the fuel container so as to interrupt the flow between the helical fins.

The fuel containers are supported in the graphite container 4 by means of clamping rings 10 one at each end of the fuel element. The rings 10 fit into slots 11 cut in end closure members 12 for the fuel containers and are held in position by clamps 13 screwed into the graphite container.

The rings 10 have shoulders 14 which are disposed on either side of each container to limit its movement in the direction of the slot.

FIGURE 3 shows an enlarged view of this clamping arrangement.

In the form of graphite container illustrated, the ends of the tube are reinforced by metal members 15 and 16 at the upper and lower ends of the element respectively. The member 15 at the upper end of each graphite container has a lip 15a which a lifting grab can engage to lift the element.

The members 15 and 16 are dimensioned so that when in position bearing against the walls of the moderator the remainder of the graphite container is spaced from the moderator.

Channels 17 (see FIGURE 2) are formed in the said members to permit a cooling gas to flow through the spaces formed between the graphite containers and the wall of the moderator channel.

Referring now to FIGURE 4 and FIGURE 5 the internal cross section of the graphite container 4 can be seen more clearly as well as the helical form of the fins 18 and relation thereof to the container 4 and central member 9.

The general direction of cooling gas flow over the fuel containers 5 is axial but a secondary flow pattern is produced by the helical fins which gives a vortex type of flow pattern to the gas.

As the gas flows between the helical fins 18 it is carried around the periphery of the fuel container and reaches the spaces 19 between containers.

In these spaces 19 the shapes of the radial arms of the member 9 are such that considerable mixing takes place and the gas is subsequently directed around the other container.

The tendency is therefore for a given gas molecule to circulate around each fuel container during its passage through the graphite containers.

The vortex type flow over the fins and the considerable mixing of gas in the spaces 19 result in a gas temperature at all points which closely approximates to the mean gas temperature. The result is a considerable improvement in the heat transfer for a given pressure drop over conventional arrangements.

Whilst four containers have been shown, it is to be understood that two or more containers can be joined in a similar fashion with similar flow effects.

All that is necessary is to arrange each container at the end of a radial arm of the member 9.

The member 9 can also be used to support the fuel elements in the reactor if desired by passing a fixing member through the space 20 in the member 9.

Whilst the invention has been described with reference to its use in nuclear reactors a similar arrangement of finned elements can be used in heat exchangers for fluids in heat exchanging conditions in which one of the heat exchanging fluid flows through the centre of the finned tubes and another of the heat exchanging fluids flows around the outside thereof.

I claim:

1. A heat exchange element comprising an enclosing tube, means located in the tube and comprising a support member extending axially of the tube and having radially extending arms, tubular members located at the ends of the radial arms with their axes substantially parallel to the longitudinal axis of the tube, said members having fins on their outer surfaces which fins are, in each member, helically disposed with respect to its longitudinal axis, the radially extending arms of the support member at each place of contact with a tubular member penetrating flow channels formed between the fins on said member to prevent flow of fluid through said channels at the places of penetration, the said means being positioned in said enclosing tube to permit a fluid in heat transfer relationship with the members and flowing in the general direction of the longitudinal axis of the tube to circulate around each element in turn in a continuous unobstructed space between the tubular members and the wall of said tube.

2. A heat exchange element as claimed in claim 1 in which the inner surface of the enclosing tube has a number of arcuate recesses, a tubular member being located in each recess but spaced from the wall of the tube to permit cooling fluid to flow between each of the tubular members and between each member and the tube.

3. A fuel element for a graphite moderated nuclear reactor comprising a graphite enclosing tube, means located in the tube and comprising a support member extending axially of the tube and having radially extending arms, tubular nuclear fuel containing members located at the end of the radial arms, the axes of the tubular members being substantially parallel to the longitudinal axis of the graphite tube and said members having fins on their outer surfaces which fins are helically disposed with respect to the longitudinal axis of each member, the radially extending arms penetrating flow channels formed between the fins at each place of contact with a member to prevent flow of fluid through said channels at the place of contact, the support member and associated tubular members being positioned in the graphite tube to permit a cooling fluid flowing in the general direction of the longitudinal axis of the tube to circulate around each tubular member in turn in a continuous unobstructed space between the tubular members and the wall of the graphite tube.

4. A fuel element as claimed in claim 3 in which a closure member at each end of a tubular member has a groove thereon adapted to receive a ring member common to all the tubular members to maintain them in a fixed position relative to one another, which ring members are clamped to the graphite tube.

References Cited in the file of this patent

UNITED STATES PATENTS

| | | |
|---|---|---|
| 1,786,571 | Lonsdale | Dec. 30, 1930 |
| 1,838,105 | Murray | Dec. 29, 1931 |
| 1,993,539 | Anthony et al. | Mar. 5, 1935 |
| 2,406,121 | Young | Aug. 20, 1946 |
| 2,492,932 | Fausek et al. | Dec. 27, 1949 |
| 2,831,807 | McGarry | Apr. 22, 1958 |
| 2,863,815 | Moore et al. | Dec. 9, 1958 |
| 2,869,836 | Huet | Jan. 20, 1959 |
| 2,898,280 | Schultz | Aug. 4, 1959 |
| 2,902,422 | Hutter | Sept. 1, 1959 |

OTHER REFERENCES

Nucleonics, vol. 13, No. 6, June 1955, page 93.